United States Patent [19]

Gruensfelder et al.

[11] Patent Number: 5,979,828
[45] Date of Patent: Nov. 9, 1999

[54] APPARATUS FOR ELIMINATING GAPS IN AN AIRCRAFT

[75] Inventors: Cynthia Ann Gruensfelder; Micael Watson Geiger, both of St. Louis, Mo.; Jack Howard Jacobs, Glendale, Ariz.; Robert Henry Wille, St. Charles, Mo.

[73] Assignee: McDonnell Douglas

[21] Appl. No.: 08/848,228

[22] Filed: Apr. 30, 1997

[51] Int. Cl.⁶ .................................................. B64C 7/00
[52] U.S. Cl. .................................. 244/129.1; 244/129.4; 244/131; 277/26; 277/227; 277/921; 49/475.1
[58] Field of Search .............................. 244/130, 117 R, 244/119, 129.1, 129.4, 129.5, 131, 213; 277/26, 589, 277, 901, 921; 49/477.1, 316, 489.1, 475.1, 480.1

[56] References Cited

U.S. PATENT DOCUMENTS

| | | | |
|---|---|---|---|
| 2,104,144 | 1/1938 | Zand | 244/119 |
| 2,654,922 | 10/1953 | Krupp | 244/129.1 |
| 2,933,784 | 4/1960 | Hooverson | 244/129.1 |
| 3,042,980 | 7/1962 | Brinsmade | 244/129.1 |
| 3,074,520 | 1/1963 | Grubelich | 244/129.1 |
| 3,267,612 | 8/1966 | Horvat et al. | 244/129.5 |
| 5,134,812 | 8/1992 | Hoffman et al. | 244/131 |
| 5,222,699 | 6/1993 | Albach et al. | 244/213 |
| 5,238,308 | 8/1993 | Lang et al. | 277/901 |
| 5,368,312 | 11/1994 | Voiy et al. | 277/26 |
| 5,562,295 | 10/1996 | Wambeke et al. | 277/227 |

*Primary Examiner*—Galen L. Barefoot
*Attorney, Agent, or Firm*—Dale B. Halling

[57] ABSTRACT

An apparatus (30) for eliminating gaps (20) in a door of an airplane has an elastaueric bladder (32) bonding along an edge (24) of a door gap (20). The elastomeric bladder (32) includes a port providing for access to an interior cavity (34). A pneumatic actuator is coupled to the port.

11 Claims, 3 Drawing Sheets

APPARATUS FOR ELIMINATING GAPS IN AN AIRCRAFT

FIELD OF THE INVENTION

The present invention relates generally to the field of aircraft and more particularly to an apparatus for eliminating gaps in an aircraft.

BACKGROUND OF THE INVENTION

Modern aircraft have a number of exterior access doors such as landing gear doors, avionics access doors and bomb bay doors. Due to the large stresses and temperature variations modern aircraft encounter during flight, these doors have to accommodate changes in size and shape of the structural member forming the doors. Gaps form around the edges of the doors as a result of these changes in size. These gaps can cause turbulence that increases the drag of the aircraft. The gaps allow dirt and contaminants to enter the aircraft, including electromagnetic emissions. The turbulence and contaminants reduce the aircraft's mission effectiveness.

Thus there exists a need for an apparatus to eliminate (reduce) gaps in aircraft, so that the gaps do not result in turbulence or allow dirt and contaminants into the aircraft.

SUMMARY OF THE INVENTION

An apparatus for eliminating gaps in a door of an airplane that overcomes these and other problems has an elastomeric bladder bonding along an edge of a door gap. The elastomeric bladder includes a port providing for access to an interior cavity. A pneumatic actuator is coupled to the port.

DETAILED DESCRIPTION OF THE DRAWINGS

Figure 1:
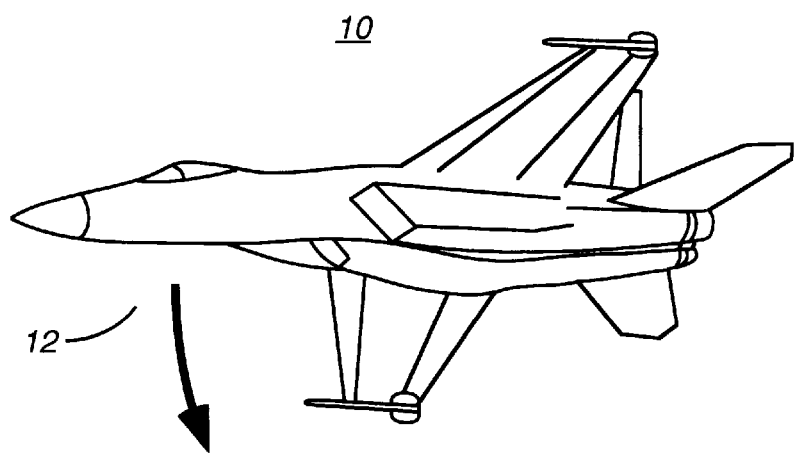
FIG. 1 is a perspective view of an aircraft.
Figure 2:
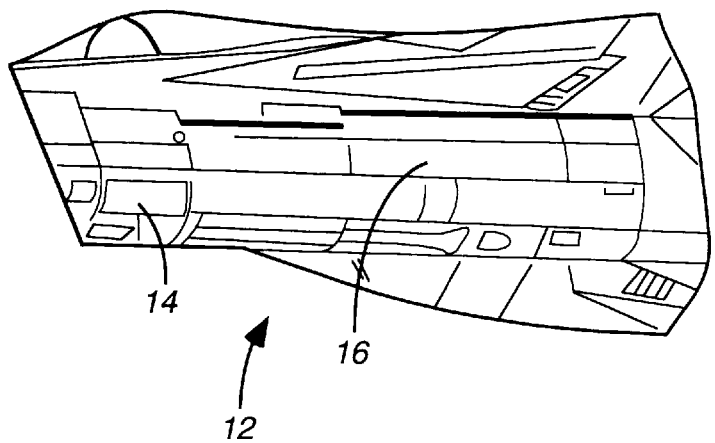
FIG. 2 is a partial expanded view of the aircraft of FIG. 1.
Figure 3:
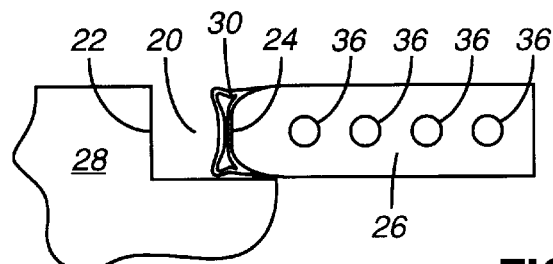
FIG. 3 is a cross sectional view of a door gap including an apparatus for eliminating gaps in a retracted position.
Figure 4:
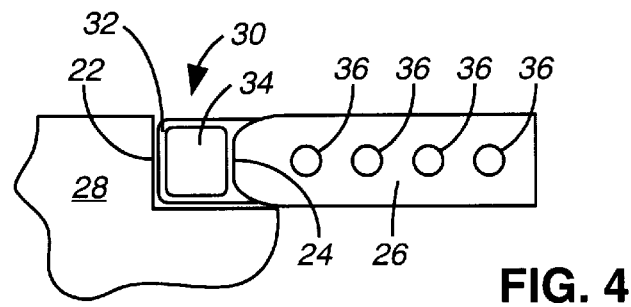
FIG. 4 is a cross sectional view of the door gap of FIG. 3 with the apparatus for eliminating gaps in a expanded position.

A modern aircraft 10 is shown in FIG. 1. The aircraft 10 has a number of exterior doors along a fuselage 12. An avionics door 14 and equipment access door 16 are shown in more detail in FIG. 2. The gaps along the edges of these doors in the prior art can be eliminated using the apparatus illustrated in FIGS. 3 and 4. In FIG. 3 a door gap 20 exists between an edge 22 and an edge 24. A door 26 is seated on a flange of the aircraft 28. An apparatus 30 for eliminating the gap 20 is attached (bonded) to the edge 24 of the door 26. In another embodiment, the apparatus 30 could be attached to the edge 22 of the aircraft 28. The apparatus 30 is an elastomeric bladder 32 having an interior cavity 34. A port to the interior cavity is attached to a pneumatic mechanism (pneumatic pump, actuation mechanism). The pneumatic pump can deflate the elastomeric bladder 30 as shown in FIG. 3 or expand the elastomeric bladder 30 as shown in FIG. 4. When the elastomeric bladder 32 is expanded, the gap 20 is substantially reduced or eliminated. This reduces the turbulence due to the gap. In addition, the apparatus 30 reduces the amount of dirt and contamination allowed inside the aircraft 28.

In another embodiment, the elastomeric bladder 32 is covered with a conductive material. The conductive material can be a metal coated woven cloth. In another embodiment the conductive material can be a conductive flexible paint. The conductive material prevents EMI from entering the aircraft 28. In yet another embodiment the elastomeric bladder is covered with an environmental coating. The environmental coating can be put over the conductive material or directly over the elastomeric bladder. The environmental coating protects the elastomeric bladder from jet fuel, hydraulic oil and a wide variety of other chemical solvents. The environmental coating is made from flourosilicones, flouroelastomers, silicones, thermoplastic elastomers, urethanes or other viable elastic materials.

The elastomeric bladder 32 can be attached to a variety of surfaces. In one embodiment the elastomeric bladder is attached to the edge of a reinforced elastomer skin 26, having reinforcing rods 36. Other common materials that the elastomeric bladder 32 is attached to include metal and composites.

Figure 5:
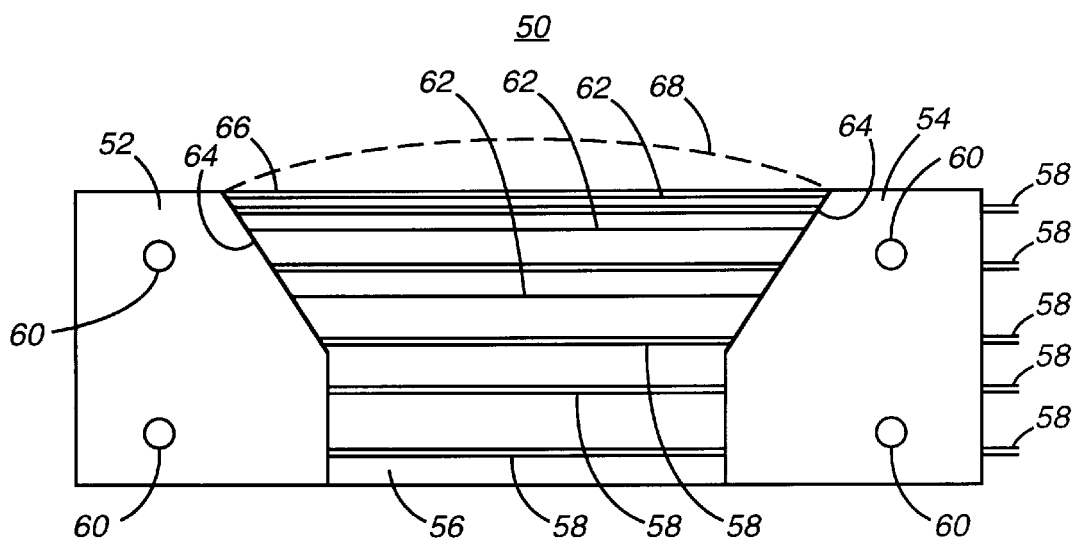
FIG. 5 is a top view of another embodiment of an apparatus for eliminating gaps in an aircraft.

FIG. 5 is another embodiment of an apparatus 50 for closing a gap in an aircraft. The apparatus 50 is a modified reinforced elastomer panel, having a pair of rod blocks 52, 54 with an elastomer skin 56 between them. A plurality of reinforcing rods 58 are attached to the rod block 52 and slide freely through elastomer skin 56 and the rod block 54. The rod blocks 52, 54 have attachment provisions 60. A plurality of shape memory alloy ribs 62 are interleaved with the plurality of reinforcing rods 58 along an angled section 64 of the rod blocks 52, 54. The shape memory alloy (SMA) ribs 62 are connected to an electrical current source. When an electrical current is applied to the SMA ribs 62 they change from a first shape to a second shape. In one embodiment, the SMA ribs 62 bow out toward the edge 66 of the elastomer 56 to push the elastomer edge 66 to the position 68 shown in dashed lines. This closes the gap next to an elastomer panel.

Figure 6A:
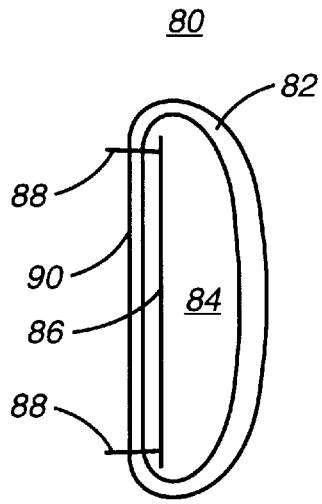
FIGS. 6a and 6b show a cross sectional view of another embodiment of an apparatus for eliminating gaps in an aircraft.
Figure 6B:
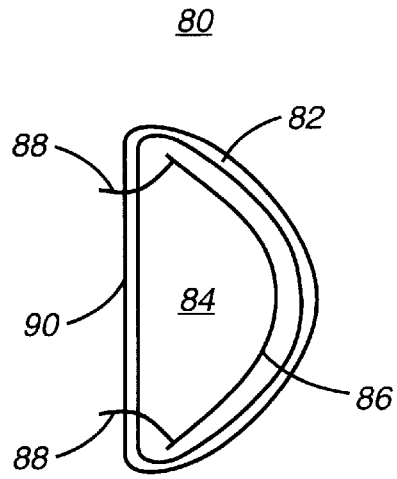

FIGS. 6a and 6b show another embodiment of an apparatus 80 for eliminating a gap in an aircraft. An elastomeric sock 82 has an internal cavity 84. A plurality of shape memory alloy (SMA) ribs 86 extend along the length of the elastomeric sock 82. When the SMA ribs are in the expanded position (FIG. 6b) the elastomeric sock is pushed outward to close a gap. A pair of electrical leads 88 are used to provide electrical current to the SMA ribs 86 and to cause the electrical ribs to change from a retracted position (FIG. 6a) to the expanded position. An edge 90 of the elastomeric sock can be bonded to edge of a door gap. The apparatus 80 can be attached where ever a gap exists on an aircraft.

Figure 7A:
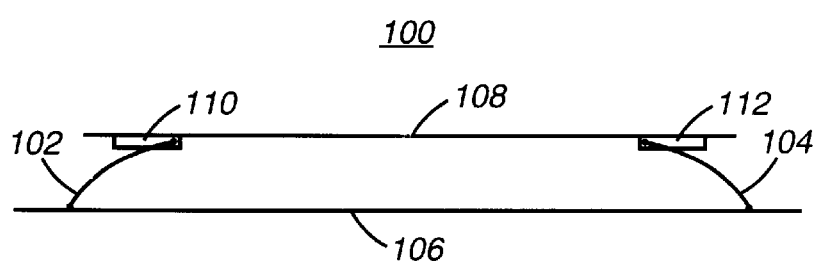
FIGS. 7a and 7b show a cross sectional view of part of another embodiment of an apparatus for eliminating gaps in an aircraft.
Figure 7B:
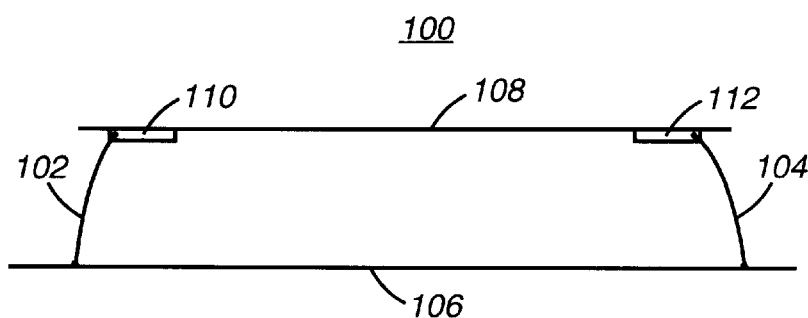

FIGS. 7a and 7b show part of another embodiment of an apparatus 100 for closing a door gap on an aircraft. The apparatus 100 of FIGS. 7a and 7b would be encased in an elastomeric bladder. The apparatus 100 has a shape memory alloy spring 102, 104 that is attached to a base 106 and connected to a rigid member 108. The SMA spring 102, 104 slides along a slat 110, 112 when the SMA spring changes from a retracted position (FIG. 7a) to an expanded position (FIG. 7b). When the apparatus is in the expanded position, the rigid member 108 pushes an elastomeric bladder outward to close a door gap. The elastomer covering the base 106 is bonded (attached) to an edge of a gap.

Thus there has been described an apparatus for closing (eliminating) a gap in an aircraft. The apparatus reduces the turbulence due to gaps, reduces the amount of dirt and contaminates that enter the aircraft and reduces the EMI that can enter the aircraft. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An apparatus for eliminating gaps in a door of an airplane comprising:

an elastomeric bladder bonding along an edge of a door gap;

a metal coated woven cloth covering the elastomneric bladder;

a port providing access to an interior cavity of the elastomeric bladder;

a pneumatic actuator coupled to the port; and a plurality of shape memory alloy ribs in the elastomeric bladder.

2. The apparatus of claim 1, wherein the plurality of shape memory alloy ribs have a retracted position and an expanded position.

3. An apparatus for sealing a door gap on an aircraft, comprising:

an elastomeric bladder;

a base inside the elastomeric bladder;

a rigid member inside the elastomeric bladder, the rigid member having a slat; and a shape memory alloy spring attached to the base and sliding along the slat of the rigid member.

4. The apparatus of claim 3, wherein the elastomeric bladder is bonded to the edge.

5. The apparatus of claim 3, further including a conductive material that is elastic and covers the elastomeric sock.

6. The apparatus of claim 3, further including an envirormental coating over the conductive material.

7. The apparatus of claim 6, wherein the environmental coating is impervious to a plurality of chemical solvents.

8. An apparatus for closing a gap in an airplane, comprising:

a hollow elastomeric strip connect to an edge of the gap;

an elastic environmental coating covering an exterior surface of the hollow elastomeric strip; and a plurality of shape memory alloy ribs extending along the length and inside of the hollow elastomeric strip.

9. The apparatus of claim 8, further including a conductive elastic material between the exterior surface and the elastic environmental coating.

10. An apparatus for eliminating gaps, comprising:

a structural block;

an elastomer panel attach to an edge of the structural block;

a plurality of reinforcing members attached to the structural block and extending through the elastomer panel;

a plurality of shape memory alloy ribs connected to the structural block; and a second structural block attached to the elastomer panel and attached to the plurality of shape memory alloy ribs.

11. The apparatus of claim 10, wherein the plurality of shape memory alloy ribs have a first state and a second state.

\* \* \* \* \*